Patented Oct. 22, 1935

2,018,313

UNITED STATES PATENT OFFICE 2,018,313

COMPOSITION OF OR CONTAINING RUBBER AND METHOD OF MAKING THE SAME

Edward Arthur Murphy, Erdington, Birmingham, Frank Theodore Purkis, Moseley, and Douglas Frank Twiss, Wylde Green, England, assignors to Dunlop Rubber Company, Ltd., Erdington, Birmingham, England, a corporation of Great Britain No Drawing. Application January 27, 1932, Serial No. 589,307. In Great Britain February 11, 1931

10 Claims. (Cl. 134—17)

This invention relates to the production of compositions of or containing rubber, or the like from aqueous dispersions of the kinds hereinafter specified.

The object of the invention is to produce substantially uncoagulated aqueous compositions of or containing rubber or the like suitable as adhesives for fibrous material especially leather to rubber.

It is known to use rubber solutions and rubber latices to produce a bonding of leather to vulcanized rubber. In such cases the rubber solutions are usually applied to the vulcanized rubber surface and the rubber latices to the leather surface and the two films after partial or complete drying, brought into contact to effect the adhesion of the rubber to the leather.

Generally good adhesion is obtained between a leather and a latex rubber film, but poor adhesion between a latex rubber film and ordinary vulcanized rubber. On the other hand, films obtained from rubber solutions adhere well to vulcanized rubber and not so well to leather surfaces.

According to the present invention the substantially uncoagulated aqueous compositions of or containing rubber or the like are produced by admixing the aforesaid dispersions of rubber or the like with an aqueous emulsion of a rubber solvent in the presence of one or more suitable destabilizing agents such as an alcohol, particularly ethyl alcohol, acetone or zinc oxide under such conditions that no coagulation takes place as for instance in the presence of sufficient protective colloids to prevent coagulation by the solvent and destabilizing agent.

It has now been found for example, that mixtures of rubber latex, rubber solvents such as coal tar naphtha or carbon tetrachloride and an alcohol e. g. ethyl alcohol and/or acetone and/or zinc oxide have the combined good adhesive properties of latex and rubber solutions with respect to vulcanized rubber and leather surfaces and other fibrous surfaces.

The emulsions or dispersions of rubber or the like comprise those consisting of or containing rubber, gutta-percha, balata or similar vegetable resins occurring naturally or artificially obtained. Such artificial aqueous dispersions may include those of coagulated rubber, vulcanized rubber, synthetic rubber, waste or reclaim.

If desired, any of the aforementioned dispersions may be used alone or in admixture with one another.

Any of the aforesaid dispersions may contain the usual known compounding and vulcanizing ingredients and/or may be in concentrated form.

Concentrates such as are obtained in Patent 1,846,164, February 23, 1932, to which may be added any one or more of the usual compounding ingredients, may also be used.

The following are examples of adhesive compositions according to the invention.

Example 1

A composition containing rubber latex and an aqueous emulsion of a rubber solvent in admixture with an alcohol and consisting of:—

| | Parts by weight |
|---|---|
| Rubber | 30 |
| Coal tar naphtha | 20 |
| Methylated spirit | 10 |
| Water | 40 | is prepared by admixing with 50 parts of concentrated rubber latex produced by centrifugalization and containing 50% rubber content 40 parts of an aqueous dispersion of coal tar naphtha containing 50% thereof, to which 10 parts of methylated spirit have previously been added. It is preferable to add the aqueous dispersion of the solvent to the latex.

The coal tar naphtha dispersion is prepared by dispersing the naphtha in water in the presence of oleic acid, gelatine and ammonia.

A suitable coal tar naphtha dispersion can be made to have the following composition:—

| | Parts by weight |
|---|---|
| Naphtha | 100 |
| Oleic acid | 1.5 |
| Gelatine | 1.0 |
| Ammonia | 2.5 |
| Water | 95.0 |

Example 2

To 100 parts of rubber, as 60% rubber latex, add first 40 parts of 25% sodium silicate solution (20 parts of "waterglass" diluted with an equal weight of water) and then 5 parts of casein as a 10% solution in dilute ammonia. Into this treated latex, stir a mixture of 100 parts of a 50% carbon tetrachloride dispersion (prepared in a similar manner to the coal tar naphtha dispersion) and 20 parts of methylated spirits.

Having now particularly described and ascertained the nature of our said invention and in what manner the same is to be performed, we declare that what we claim is:—

1. A method of producing substantially uncoagulated aqueous compositions comprising rubber or the like from aqueous dispersions thereof and suitable as adhesives for fibrous material to rubber which comprises admixing, without coagulation, a dispersion of rubber with an aqueous emulsion of a rubber solvent in the presence of one or more suitable destabilizing agents.

2. A method as claimed in claim 1 wherein the destabilizing agent is an alcohol of low molecular weight.

3. A method as claimed in claim 1 wherein the destabilizing agent is acetone.

4. A method as claimed in claim 1 wherein the destabilizing agent is zinc oxide.

5. A method as claimed in claim 1 wherein the rubber solvent is coal tar naphtha or carbon tetrachloride.

6. A method as claimed in claim 1 wherein sufficient protective colloids are present to prevent coagulation by the solvent and destabilizing agent.

7. A process of making uncoagulated aqueous compositions comprising rubber which comprises admixing concentrated rubber latex with an aqueous dispersion of coal tar naphtha and a smaller quantity of methylated spirit in which the concentrations of rubber content and of naphtha in said latex and dispersion, respectively, are substantially equal and are approximately 50%, and in which the proportions of latex, naphtha and methylated spirit are, respectively, 5 parts, 4 parts and 1 part, and in which said naphtha is dispersed in the presence of a stabilizing colloid comprising oleic acid.

8. A method of making uncoagulated rubber compositions of the type described, which comprises adding 45 parts of 25% sodium silicate solution and 5 parts of casein as a 10% solution in dilute ammonia to 100 parts of rubber as a 60% dispersion, stirring a mixture of 100 parts of 50% carbon tetrachloride dispersion and 20 parts of methylated spirits to the rubber dispersion.

9. A composition comprising a mixture of an aqueous emulsion of a rubber solvent, an aqueous dispersion of uncoagulated rubber material and a destabilizing agent the proportion of solvent to rubber being sufficient to form a solution upon precipitation from the aqueous medium.

10. The composition of claim 9, in which the destabilizing agent is an alcohol.

EDWARD ARTHUR MURPHY.
FRANK THEODORE PURKIS.
DOUGLAS FRANK TWISS.